United States Patent [19]

Gimmestad et al.

[11] Patent Number: 4,468,203
[45] Date of Patent: Aug. 28, 1984

[54] CLASSROOM DEMONSTRATION CALCULATOR

[76] Inventors: Beverly Gimmestad, 1019 College Ave., Houghton, Mich. 49931; Douglas Brumm, 1140 Rockhouse Rd., Calumet, Mich. 49913

[21] Appl. No.: 529,939

[22] Filed: Sep. 6, 1983

[51] Int. Cl.³ .......................... G09B 5/00; G09B 19/02
[52] U.S. Cl. .................................. 434/228; 434/188; 434/365; 434/430
[58] Field of Search ............... 434/228, 232, 188, 365, 434/430

[56] References Cited

U.S. PATENT DOCUMENTS

| | | | |
|---|---|---|---|
| D. 252,301 | 7/1979 | McCarty | D6/155 |
| 450,615 | 4/1891 | Delany | 434/430 X |
| 2,962,819 | 12/1960 | Kerridge | 434/228 |
| 3,812,277 | 5/1974 | Schwartzman | 434/228 |
| 4,154,007 | 5/1979 | Judd | 434/365 |

*Primary Examiner*—William H. Grieb

[57] ABSTRACT

A teaching device, for use in a classroom, comprising a hand-held size calculator adapted to normally include a display for showing the numerical output of the calculator, and adapted to include a face plate having a plurality of keys which are arranged in a particular pattern and which bear indicia indicating the calculator function of the keys. The calculator does include a circuit for producing a signal in response to depression of the face plate keys of the hand-held size calculator. The teaching device further includes an enlarged keyboard including a plurality of enlarged keys arranged in a key pattern simulating the face plate keys of the hand-held size calculator, and indicia on the enlarged keys simulating the indicia on the faceplate keys of the hand-held size calculator. The indicia is readily readable anywhere within the classroom. The keyboard also includes a plurality of switches responsive to depression of the keyboard keys. The teaching device also includes wiring for operably connecting the keyboard switches to the signal producing circuit so that the keyboard switches operate the calculator in the same manner as the face plate keys of the hand-held size calculator. The teaching device also includes an enlarged display including numerical characters readily readable anywhere within the classroom, and an interface circuit for operably connecting the enlarged numerical display to the signal producing circuit so that the enlarged display shows the numerical output of the calculator.

3 Claims, 5 Drawing Figures

4,468,203

CLASSROOM DEMONSTRATION CALCULATOR

BACKGROUND OF THE INVENTION

This invention relates to teaching or instructional devices for use in classrooms and, more particularly, to teaching devices for use in teaching the operation of hand-held calculators.

Teachers have experienced difficulties in the explanation of the operation of hand-held calculators because such calculators are of such a small size that students seated in a classroom are unable to see the keys of the calculator, and the resulting calculator display, as the keys are depressed by an instructor standing in the front of the classroom.

One prior art device has sought to cure part of this problem by providing an enlarged numerical display operably connected to a hand-held calculator. This device is illustrated in the McCarty U.S. Pat. No. De. 252,301 issued July 10, 1979 and is produced by Educational Calculator Devices of Laguna Beach, Calif. The device, however, does not permit the students in the classroom to see which keys are depressed by the instructor.

SUMMARY OF THE INVENTION

One of the principal objects of this invention is to provide a demonstration calculator, of simple manufacture, which can be used by an instructor in a classroom to demonstrate keyboard manipulation and calculator operation of a hand-held calculator so that every student in the classroom can see the demonstration.

To accomplish this and other objectives, this invention provides a teaching device, for use in a classroom, comprising a hand-held size calculator of the type adapted to include a display for showing the numerical output of the calculator and a face plate having a plurality of keys which are arranged in a particular pattern and which bear indicia indicating the calculator function of the keys. The calculator does include means for producing a signal in response to depression of face plate keys of the hand-held size calculator. The teaching device further includes an enlarged keyboard including a plurality of enlarged keys arranged in a key pattern simulating face plate keys of the hand-held size calculator, and indicia on the enlarged keys simulating indicia on face plate keys of the calculator. The indicia are readily readable anywhere within the classrooms. The keyboard also includes a plurality of switches responsive to depression of the keyboard keys. The teaching device also includes means for operably connecting the keyboard switches to the signal producing means so that the keyboard switches operate the calculator in the same manner as the face plate keys of the hand-held size calculator. The teaching device also includes an enlarged display including numerical characters readily readable anywhere within the classroom, and means for operably connecting the enlarged numerical display to the signal producing means so that the enlarged display shows the numerical output of the calculator.

In one embodiment, the calculator is enclosed within a housing, and the enlarged keyboard includes a keyboard portion of a face panel for the housing, and the enlarged numerical display includes a display portion of the face panel adjacent the keyboard portion.

DESCRIPTION OF THE PREFERRED EMBODIMENT

Figure 1:
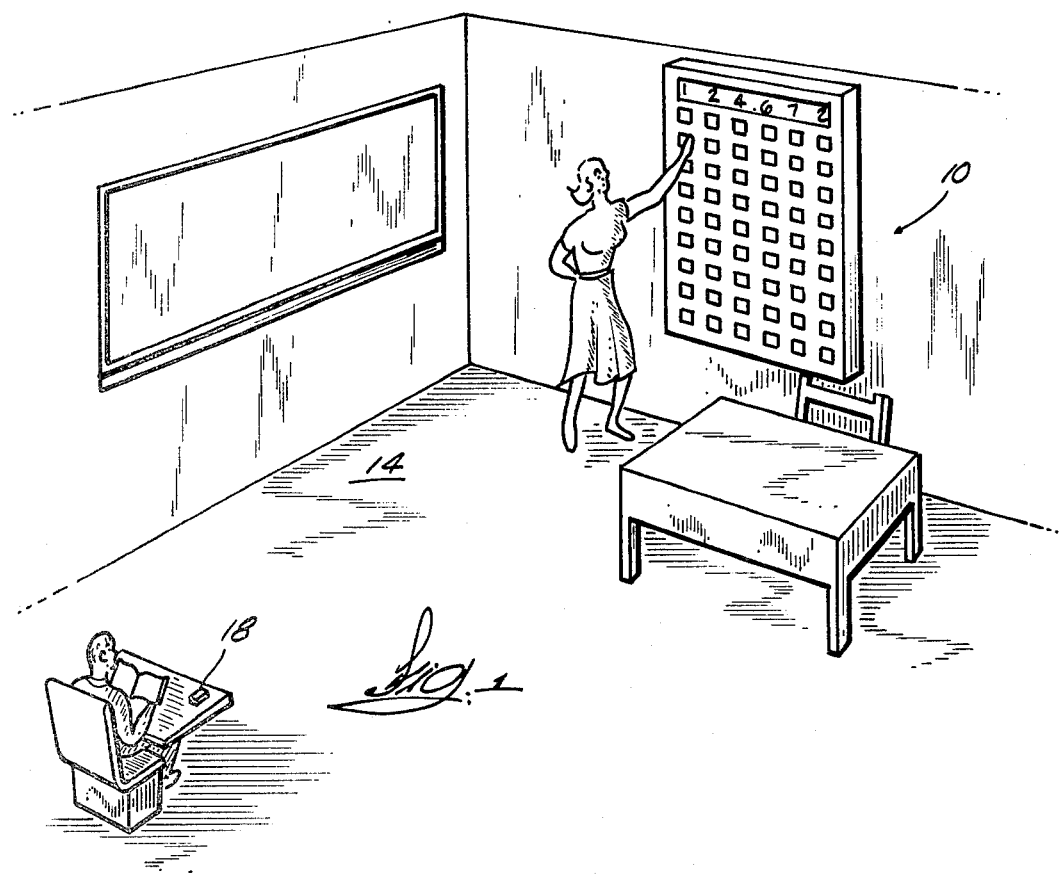
FIG. 1 is a perspective view of a teaching device, which is mounted on a wall in a classroom, which embodies various features of the invention.

As illustrated in the drawings, and particularly in FIG. 1, this invention provides a teaching device 10 for use in a classroom 14 in demonstrating and teaching the use or operation of a hand-held calculator 18. The hand-held size calculator 18 to be demonstrated can be one of many commercially available which the classroom teacher wishes to use for classroom instruction. In the illustrated embodiment, a TI-59 calculator is used and is commercially available from Texas Instruments of Dallas, Tex. The components and operations of such calculators 18 are generally known and understood, and will only be described herein as necessary to describe the invention.

The hand-held size calculator 18 is of the type which normally includes, in addition to the usual calculator circuitry, a face plate 22 and numerical display 26. The face plate 22 includes a plurality of keys 30, supported for vertical movement relative to the face of the calculator 18, and arranged in a particular key pattern. The keys 30 include appropriate indicia 34 to indicate the keys' calculator function. The calculator 18 also normally includes switches 38, incorporated in a keyboard 46, and mounted behind the face plate 22 of the calculator 18, in such a manner that the switches 38 are normally responsive to depression of the face plate keys 30.

The teaching device 10 of this invention includes one of these hand-held calculators 18, but with the face plate 22 and numerical display 26 either removed or not used. The calculator 18, however, does include means 42 for producing a signal in response to depression of the face plate keys 30 and actuation of the calculator switches 38.

Figure 2:
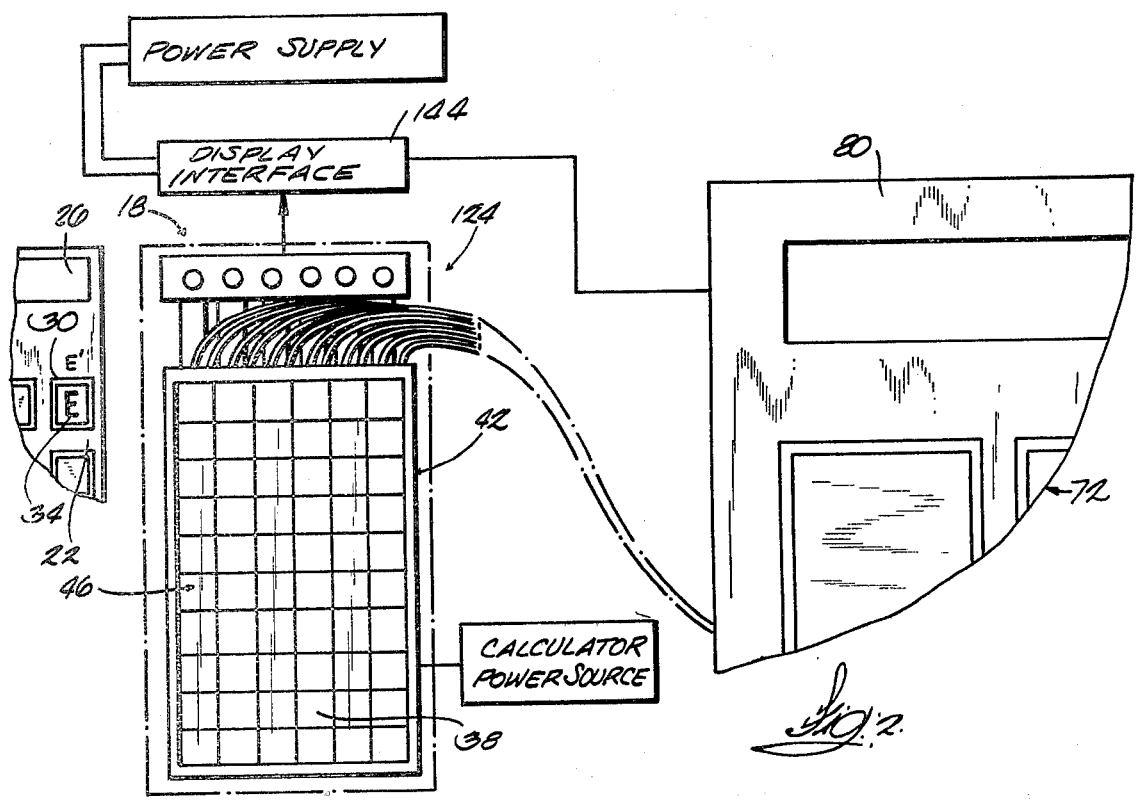
FIG. 2 is an enlarged partial schematic view of the components of the teaching device shown in FIG. 1.

The signal producing means 42 is a circuit incorporated in the calculator computing circuitry, and is commercially available and understood. As illustrated in FIG. 2, this signal producing circuit 42 produces signals, at leads (not shown) between the calculator circuitry and the calculator display 26, in order to illuminate the calculator display 26.

Figure 3:
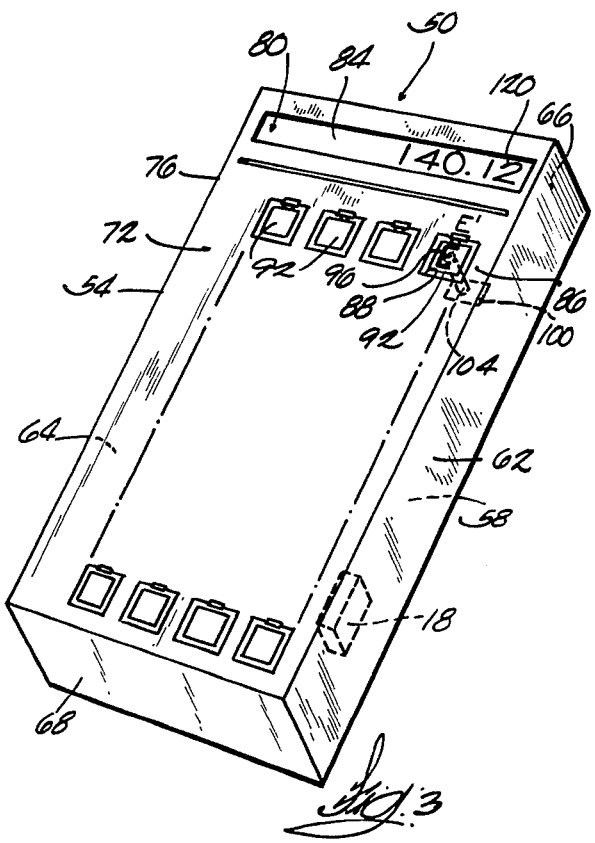
FIG. 3 is a partial perspective view of the teaching device shown in FIG. 1.

As illustrated in FIG. 3, in addition to the calculator 18 with the components just described, the teaching device 10 also comprises a housing 50 which includes a face panel 54, a back panel 58, side panels 62 and 64 and top and bottom panels 66 and 69, respectively. The calculator 18 is enclosed within this housing and, in the illustrated arrangement, is mounted on the back panel.

As illustrated in FIG. 1, the teaching device 10 is adapted to be mounted on a wall in the classroom 14. More particularly, hooks are attached to the rear of the housing back panel 58, and attached to a rail on the upper edge of the wall. Ball bearings can also be provided so the teaching device 10 can easily slide along the wall in the classroom 14.

As illustrated in FIG. 3, the teaching device 10 also includes an enlarged keyboard 72 including a keyboard portion 76 of the face panel 54, and an enlarged display 80 including a numerical display portion 84, of the face panel 54, adjacent and above the keyboard portion 76.

The keyboard portion 76 is an enlarged mock-up of the calculator face plate 22. More particularly, in the particular embodiment illustrated, the keyboard portion 76 comprises a frame made of plywood, or some other suitable material, which includes a plurality of rectangular openings 88. Supported in the rectangular openings 88 are square box keys 92 resembling the keys 30 in the calculator face plate 22. The keyboard keys 92 are arranged in the same pattern as the calculator face plate keys 30, and bear indicia 96 generally identical to the indicia 34 on the calculator face plate keys 30. Indicia 34 on the face plate 22, other than on the calculator keys 30, are also reproduced as indicia 96 on the keyboard portion frame 86. Each of the keyboard keys 92 is hinged at the top thereof to the keyboard portion frame 86 to permit rearward swinging of the keys 92 relative to the back panel 58.

The keyboard 72 also includes a plurality of switches 100 which are mounted on the back panel 58 of the housing 50. The keyboard switches 100 are arranged so that the switches 100 are activated when the keyboard keys 92 are depressed by a classroom instructor, resulting in the pivoting of the keys 92 rearwardly. In this particular embodiment, means in the form of dowel rods 104 is provided for striking and actuating the switches 100 in response to this rearward movement of the keys 92. More particularly, the dowel rods 104 extend rearwardly and perpendicularly from the face of the keys 92. In other embodiments (not shown) the keyboard keys 92 can comprise a flexible membrane and the switches can be located directly behind the flexible membrane. Any commercially available touch-actuated switch 100 may be used in the device 10, such as, for example, the Brady 14144 Membrane Switch.

The numerical display 80 of the teaching device 10 also comprises a plurality of illuminating means mounted in the display portion 84 of the housing 50, which form numerical characters. The illuminating means can be made of various commercially available illuminating devices, such as, in the embodiment shown, a neon gas display. The neon gas display includes a neon gas chamber and a plurality of electrodes arranged in groups of identical segments, in the exposed portion of the gas chamber to form a plurality of numerical characters 120. The neon gas adjacent the respective electrode becomes illuminated in response to energization of that electrode. Such a display 108 is well known and commercially available as a Beckman SP-101 Neon Display.

The size of the device 10 and, more particularly, the keyboard keys 92, the indicia 96 thereon, and the numerical characters 120 formed on the display portion 84 of the device 10 are sized so as to be readily readable by any student situated anywhere within the classroom 14. As a result, any student is able to observe keyboard manipulation of the teaching device 10 by an instructor, and the resulting numerical output 120 of the device 10, so the student can fully understand and appreciate how to use the hand-held size calculator 18 which the teaching device 10 demonstrates. In the particular embodiment shown, the housing 50 is about 43 inches high, 22 inches wide and 4 inches deep.

Figure 4:
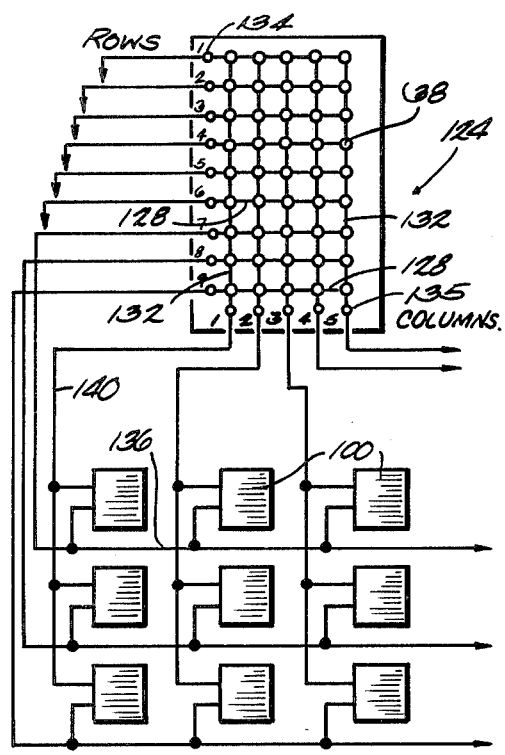
FIG. 4 is a schematic diagram of part of the wiring of the device switches and the calculator switches embodied in the teaching device shown in FIG. 1.

As illustrated schematically in FIG. 4, the teaching device 10 also includes means 124 for operably connecting the keyboard switches 100 to the signal producing circuit 42 of the calculator, so that operation of the keyboard switches 100 results in calculator operation.

More particularly, as illustrated schematically in FIG. 3, the calculator switches 38 are connected to the signal producing circuit 42 by a plurality of parallel wires 128 which extend across and which are operably connected to the rows of switches 38 in the calculator 18, and a plurality of parallel wires 132 which extend across and which are operably connected to the columns of switches 38 in the calculator 18. The wires 128 and 132 are, in turn, connected to corresponding leads 134 and 135, respectively, to the signal producing circuit 42. This wiring scheme for hand-held calculators is well known and understood.

The means 124 for operably connecting the keyboard switches 100 to the signal producing circuit 42 similarly includes parallel wires 136 which extend across and which are operably connected to the rows of keyboard switches 100, and a plurality of parallel wires 140 which extend across and which are operably connected to the columns of keyboard switches 100. The respective wires 136 and 140 from the device 10 are also connected to the corresponding leads 134 and 135, respectively, so that operation of the keyboard keys 92 results in calculator operation.

Figure 5:
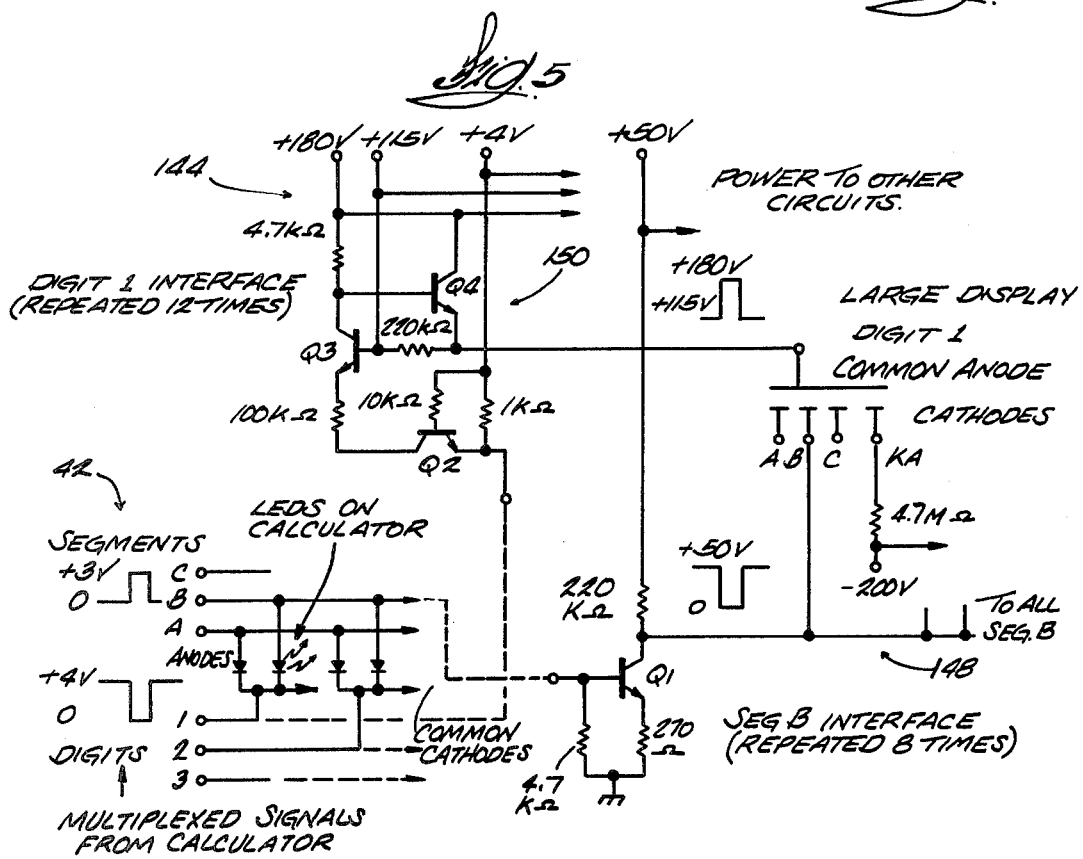
FIG. 5 is a schematic diagram of part of the display interface circuit of the teaching device shown in FIG. 1.

As illustrated schematically in FIG. 5, the teaching device 10 further includes means 144 for operably connecting the enlarged display 80 to the signal producing circuit 42, so signals from the signal producing circuit 42 are used to energize the enlarged display 80.

More particularly, the display 26 for this particular calculator consists of 12 digits, with each digit being made up of seven segments, plus a segment for a decimal point. In other calculators, more or less digits may be used. The signal producing circuit 42 provides a high-going (positive) voltage to each of the identical segments provided for each digit, and a low-going (negative) voltage to each digit group of segments, in order to energize the display. The resulting positive voltage pulses to the appropriate set of segments, at the same time negative pulses are sent to the appropriate digit group, serve to energize the appropriate display digit segment. A number of segments must be energized at one time, however, to form a particular numerical display. In order to avoid a duplication of wiring, the calculator pulses are emitted multiplexed, or sequentially and with repetition, to the appropriate segments at such a rate that all of the appropriate segments appear to be illuminated continuously.

These same signals, only with voltage amplification, are used to drive the corresponding segments (formed by the electrodes in this embodiment) forming the digits of the device's display 80. The enlarged display 80 has the same number of digits or characters as the calculator display 26.

The interface means 144 therefore includes means (not shown) for obtaining the desired set of voltages needed for the enlarged display 80 (as indicated in FIG. 4) which comprises a transformer, means for connection of the transformer to an external power source, and integrated voltage regulator chips, all of which are commercially available and commonly known and understood. The power supply provided for the display 80 can also be used for the calculator 18, or a separate power supply can be used.

The interface means 144 also includes switching circuits or drivers 148 and, provided for each set of segments and each digit group, respectively, which convert the positive pulses from the signal producing circuit 42 to higher voltage negative pulses for the display set of segments, and which convert the negative pulses from the signal producing circuit 42 to higher voltage positive pulses for the enlarged display digit groups.

The following description of FIG. 5 illustrates, more particularly, the manner in which each particular digit segment of the device's display 80 is operated by the signal producing circuit 42.

The original calculator 18 includes the circuits necessary to drive a common-cathode LED display of 12 digits, each having 7 segments plus a decimal point. A portion of the original circuit 42 is shown in the lower left of FIG. 4, along with the typical signals required to turn on one of the display segments (segment B of digit 1). The signal that drives the anodes of all 12 B segments goes high as shown, at the same time that the signal driving the cathode of digit 1 goes low. This will then turn on in that digit only segment B of digit 1, with the other 7 segments in digit 1 remaining off, as well as the B segments of the other 11 digits. The 12 digit signals are timed so that only one of them is low at a time. During each digit pulse the lines corresponding to the segments to be turned on are pulled high. Thus the desired segments on each digit turn on simultaneously while the digits flash sequentially at a rate high enough to make them appear to be on continuously.

The switching circuits 148 and 150 serve to interface the original low-voltage calculator signals to the large, high-voltage neon displays 108 while retaining multiplexed operation. Separate circuits 148 and 150 are required for each digit and each segment to permit proper operation. Each of the 8 segments (usually labelled A, B, C, D, E, F, G, and DP) uses a segment interface circuit 148 like the example shown for segment B. It consists of a switching transistor, Q1, and three resistors. When a particular segment signal is low (that segment is not selected) then Q1 is off and 50 V is applied to segment B of all 12 large display units. This results in a voltage across all B segments that is too low to turn them on. When the segment B signal from the calculator goes high, Q1 turns on, pulling its collector down nearly to ground level (zero volts) and increasing the voltage across the display for all B segments. This voltage is not sufficient, by itself, to turn on the segment, however; coordination with the digit signals is required.

The digit drivers 150 are similar in principle but slightly more complex. The example shown is for digit 1, and comprises transistors Q2, 3, and 4 plus a few resistors. When the digit 1 signal from the calculator is high (digit 1 is off) Q2, 3, and 4 are all off. This produces a voltage on the digit 1 anode of 115 V. The resulting potential differences across the segments of digit 1 are too low to turn them on, even if one of the segment voltages has been pulled low. When the digit 1 signal from the calculator goes low, Q2 is turned on which causes Q3 and Q4 also to turn on. This results in the full supply voltage of 180 V being applied to the anode of digit 1. This voltage is enough to turn on any segments that are at ground potential but not those that are at 50 V. The result is that segment B of digit 1, for example, will light only when both digit 1 and segment B are selected, as desired.

In addition to the twelve sets of eight digit segments, a keep alive segment KA is provided, as illustrated in FIG. 5, with a voltage difference of about 150 volts, to keep the neon gas in the gas chamber energized in order to permit rapid illumination of the neon gas around the electrodes 116 in response to energization of the electrodes 116 forming each digit.

The above described device display portion 84 is commercially available from Educational Calculator Devices of Laguna Beach, Calif.

It is to be understood that the invention is not confined to the particular construction and arrangement of parts herein illustrated and described, but embraces all such modified forms thereof as come within the scope of the following claims.

We claim:

1. A teaching device for use in a classroom, said device comprising
   a hand-held size calculator adapted to include a display for showing the numerical output of said calculator and adapted to include a face plate having a plurality of keys which are arranged in a particular pattern and which bear indicia indicating the calculator function of the keys, said calculator including means for producing a signal in response to depression of face plate keys of said hand-held size calculator,
   an enlarged keyboard including a plurality of enlarged keys arranged in a pattern simulating the pattern of face plate keys of said hand-held size calculator,
   indicia on said enlarged keys simulating indicia on face plate keys of said hand-held size calculator, said indicia being readily readable anywhere within the classroom,
   keyboard switches responsive to depression of said enlarged keys,
   means for operably connecting said keyboard switches to said means for producing a signal so that said keyboard switches operate said hand-held size calculator in the same manner as face plate keys of said hand-held size calculator,
   an enlarged display including numerical characters readily readable anywhere within the classroom, and
   means for operably connecting said enlarged numerical display to said means for producing a signal so that said enlarged display shows the numerical output of said hand-held size calculator.

2. A teaching device in accordance with claim 1 wherein said calculator is enclosed within a housing including a face panel, and wherein said enlarged keyboard includes a keyboard portion of said face panel, and wherein said enlarged numerical display includes a display portion of said face panel adjacent said keyboard portion.

3. A teaching device in accordance with claim 2 wherein said housing further includes
   a back panel supported in spaced-rearward relationship to said face panel, and
   wherein said keyboard keys are mounted in said keyboard portion for perpendicular movement relative to said back panel, and
   wherein said keyboard switches are mounted on said back panel and arranged in corresponding relationship to said keyboard keys.

* * * * *